(12) United States Patent
Singh et al.

(10) Patent No.: US 8,392,543 B1
(45) Date of Patent: Mar. 5, 2013

(54) SYNCHRONIZATION OF CONTENT CHANGE ACROSS MULTIPLE DEVICES

(75) Inventors: Ashish Kumar Singh, Herndon, VA (US); William Michael Parsel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 689 days.

(21) Appl. No.: 12/363,342

(22) Filed: Jan. 30, 2009

(51) Int. Cl.
*G06F 15/177* (2006.01)
*G06F 9/44* (2006.01)

(52) U.S. Cl. ......................... 709/221; 717/168

(58) Field of Classification Search .................. 709/221; 717/168, 171, 173
See application file for complete search history.

(56) References Cited

U.S. PATENT DOCUMENTS

| | | | |
|---|---|---|---|
| 2005/0165913 A1* | 7/2005 | Coulombe et al. | 709/219 |
| 2007/0100834 A1* | 5/2007 | Landry et al. | 707/10 |
| 2007/0168420 A1* | 7/2007 | Morris | 709/204 |
| 2007/0240030 A1* | 10/2007 | Cronstrom | 715/500.1 |
| 2008/0242280 A1* | 10/2008 | Shapiro et al. | 455/414.3 |
| 2008/0301670 A1* | 12/2008 | Gouge et al. | 717/173 |
| 2009/0007198 A1* | 1/2009 | Lavender et al. | 725/91 |
| 2010/0095199 A1* | 4/2010 | Oh et al. | 715/234 |

* cited by examiner

*Primary Examiner* — Jeong S Park (57) ABSTRACT

A method, system, and medium are provided for a global synchronization system (GSS). The GSS includes a global synchronization server and a network storage device. Content sources can be retrieved directly from the remote source, or optionally uplinked onto the network storage device. The content sources and user devices are defined, as well as the relationships of one endpoint to another, according to subscriber specifications, provided by the global synchronization system. The subscriber specifications are managed by the global synchronization server to provide synchronization of changes and updates to content sources and devices.

20 Claims, 5 Drawing Sheets

Profile Lists

Subscriber
Endpoint
    -Identifier
    -Capability
    -Data
    -State
    -Pending change log
    -Subscription
    -Observer

SYNCHRONIZATION OF CONTENT CHANGE ACROSS MULTIPLE DEVICES

INTRODUCTION

The Internet is used for a wide variety of applications, including searching on the World Wide Web (WWW), e-mail activities, interactive blog sites, and posting sites, to name just a few. A wide variety of uses and services utilize many different types of content, and therefore, require many different protocols. In addition to interacting with several different contents from several different sources, many users also have multiple devices that are utilized for these varied activities.

A number of services are available to the user to assist with managing several dynamic Internet activities across multiple devices. These services are made possible by a centralized synchronization server, which provides up-to-date information and data from selected sources, according to subscriber specifications. Some services can also provide specific services to each individual device of a subscriber. However, the effectiveness and efficiency of these services are limited, since each subscriber source is uplinked and stored on the central synchronization device. All content updates are forced to one centralized server, and then propagated to various devices. This may require several different protocols for the one centralized server, and therefore, is limited to the type and scope of content and devices that communicate with the centralized server. In addition, proliferation of Internet content services and user generated content, along with multiple user devices lead to a situation in which the content may not be accessible to a device.

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

In an embodiment of the invention, a global synchronization system synchronizes content change across multiple devices. A global synchronizing server works with several content sources of interest to a subscriber. A global synchronizing server does not require content to be uplinked to the server itself. The global synchronizing server has the option of working in conjunction with a network storage device to uplink content sources of interest to the network storage device. This frees up the global synchronization server from dealing with multiple protocols across different content sources. As a result, the global synchronization server has much more capacity to simply manage the synchronization of content sources, across multiple devices, according to subscriber preferences.

In another embodiment of the invention, a method for synchronizing changes across multiple content domains is provided. The global synchronization system provides a synchronization subscription. The user establishes a subscriber profile, along with settings for each content source and device to be synchronized. An option is available to uplink content sources onto a network storage device from a remote server or remote storage device. Management of the subscription is implemented by a global synchronization server, which works in conjunction with the network storage device. The synchronization may be managed using XML Document Manager Server (XDMS) protocol or any suitable other protocol. Content changes are synchronized between the content sources and devices by the synchronization server, according to subscriber specifications.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Embodiments of the invention provide systems and methods for a global synchronizer. This detailed description satisfies the applicable statutory requirements. The terms "step," "block," etc. might be used herein to connote different acts of methods employed, but the terms should not be interpreted as implying any particular order, unless the order of individual steps, blocks, etc is explicitly described. Likewise, the term "module," etc. might be used herein to connote different components of systems employed, but the terms should not be interpreted as implying any particular order, unless the order of individual modules, etc is explicitly described.

Throughout the description of different embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of any embodiments of the invention.

Embodiments of the invention include, among other things, a method, system, or set of instructions embodied on one or more computer-readable media. Computer-readable media include both volatile and nonvolatile media, removable and non-removable media, and media readable by a database and various other network devices. Computer-readable media comprise computer storage media and communication media. By way of example, and not limitation, computer-readable media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or distributed among multiple interconnected processing systems that may be local to, or remote from, the processing system. Communication media can embody computer-readable instructions, data structures, program modules or other data in an electronic data signal, and includes any information delivery media. By way of example, and not limitation, communication media includes wired media such as a wired network or direct-wired connection, and electronic data signals, such as acoustic, radio frequency (RF), infrared, and other wireless media. Combinations of any of the above should also be included within the scope of computer-readable media.

Figure 1:
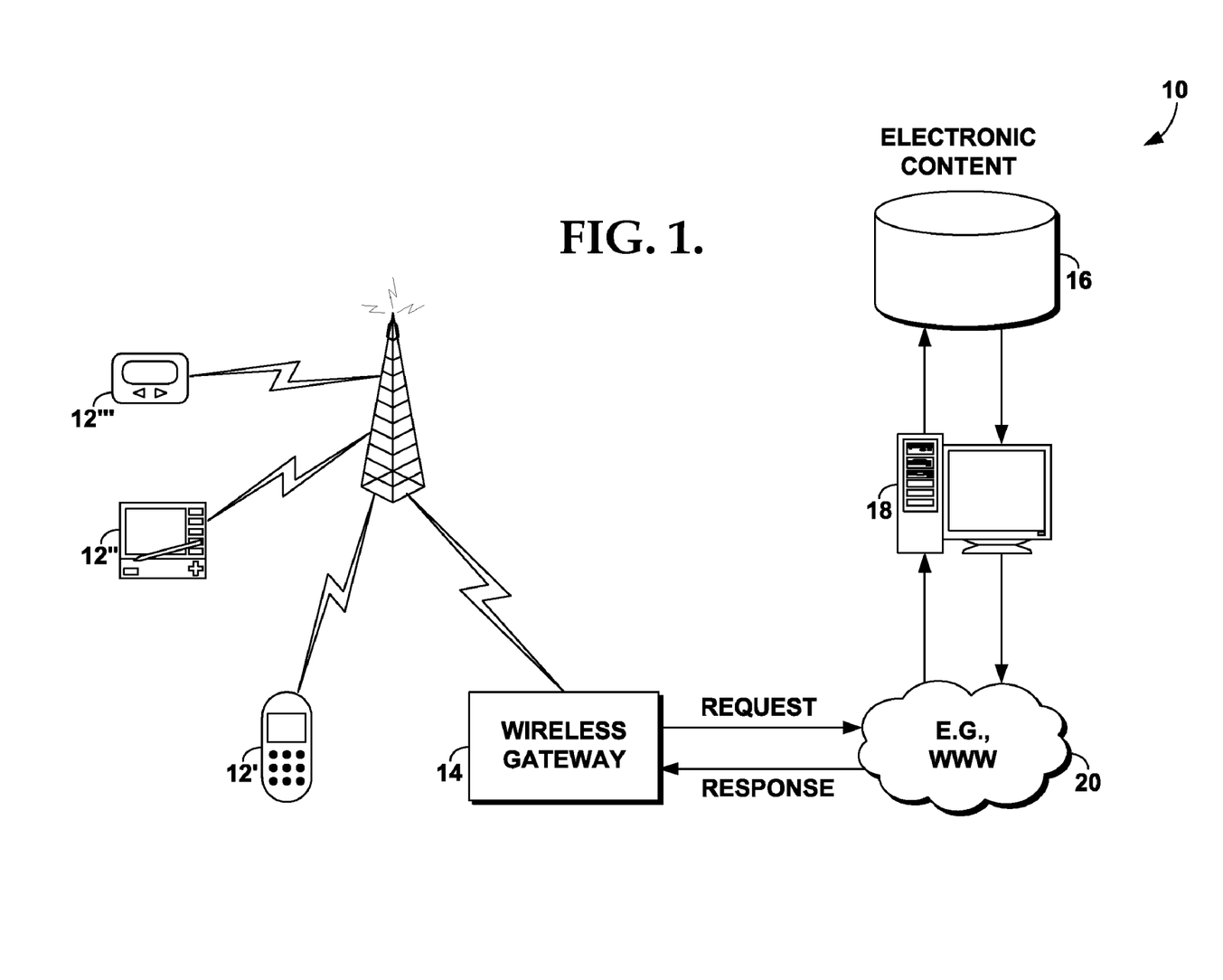
FIG. 1 is a block diagram illustrating an exemplary wireless network system.

A summary overview of a telecommunications system will be described, with reference to FIG. 1. FIG. 1 is a block diagram illustrating an exemplary wireless network system 10. Wireless network system 10 includes wireless devices 12, wireless gateways 14, databases 16 including electronic content, database servers 18, and information network 20. However, none of the embodiments of the invention are limited to these components and more, fewer or other components can also be used in wireless network system 10. For simplicity, only one wireless gateway 14, database 16 and database server 18 are illustrated in FIG. 1.

The wireless devices 12 include wireless phones 12', personal digital assistants ("PDA") 12", one and two-way pagers 12''' and other types of wireless mobile and non-mobile devices (not illustrated). Wireless devices 12 may include devices that typically connect using a wireless communications medium such as radio frequency (RF) devices, infrared (IR) devices, or integrated devices combining one or more of the preceding devices.

The information network 20 is configured to allow network connections between a client device and other networked devices, such as database server 18. The information network 20 may be configured to employ any form of carrier medium for communicating information from one computing device to another, such as through a universal serial bus (USB) port, Ethernet link, wireless forms of carrier media, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G) generation radio access for cellular systems, Wireless-LAN, or Wireless Router (WR) mesh. Access technologies such as 2G, 3G, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The wireless gateways 14 provide a code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Packet Cellular Network ("PCN"), Global System for Mobile Communications, "GSMC"), Worldwide Interoperability for Microwave Access (WiMAX), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other types of wireless interfaces for the wireless devices 12. The WAP includes several protocols and standards designed to provide wireless devices with access to electronic content, and it was developed as an alternative to other markup languages and protocols developed for the World Wide Web. One component of the WAP is a Wireless Markup Language ("WML"), which includes markup tags, and provides control over formatting and layout of electronic content. The WML is often more appropriate to use for wireless devices such as wireless phones than other markup languages such as Hyper Text Markup Language ("HTML"), etc.

The wireless gateway 14 includes virtually any device that forwards network traffic. Such devices include, for example, routers, proxies, firewalls, access points, link load balancers, devices that perform network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The databases 16 include electronic content such as text, hypertext, graphical data or references to graphical data images, audio, video, and other content. The electronic content may be stored as a web page or WAP page on a database server, such as server 18. The server 18 can download electronic content from the database 16 to the wireless device 12.

Server 18 includes any computing device capable of establishing or maintaining a network connection with a client device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

A hypertext document includes markup codes called "tags." The structure of hypertext documents is defined by document markup languages such as Hand Held Device Markup Language ("HDML"), HTML, compact HTML ("cHTML"), eXtensible Markup Language ("XML"), WML and voice extensible Markup Language (VoxML"), and others. Markup languages also allow references to additional electronic content other than text, including graphics, animation, audio, video, applets, and other electronic data.

Electronic content is displayed on a wireless device 12 with a software application, such as but not limited to a "browser." A browser on a wireless device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the wireless device 12.

The wireless devices 12 illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol ("WAP") Forum, Java Community, the American National Standard Institute ("ANSI"), or other standards.

An operating environment for devices and interfaces used for embodiments of the invention include a processing system with one or more high speed central processing unit(s) ("CPU"), or other types of processors, and a memory system. The embodiments of the invention are described below with reference to acts and symbolic representations of operations or instructions that are performed by the processing system, unless indicated otherwise. Such acts and operations or instructions are referred to as being "computer executed," "CPU executed," or "processor executed." The memory locations where data bits are maintained are physical locations that have particular electrical, magnetic, optical, or organic properties corresponding to the data bits.

Hypertext Transfer Protocol (HTTP) is a communications protocol used for retrieving inter-linked text documents (hypertext). HTTP is a request and response standard between a client, which is also known as a user agent, and a server. A mobile-to-HTTP protocol gateway (MHG) translates between standard wireless protocol commands and an application server, such as a web server on the Internet.

Figure 2:
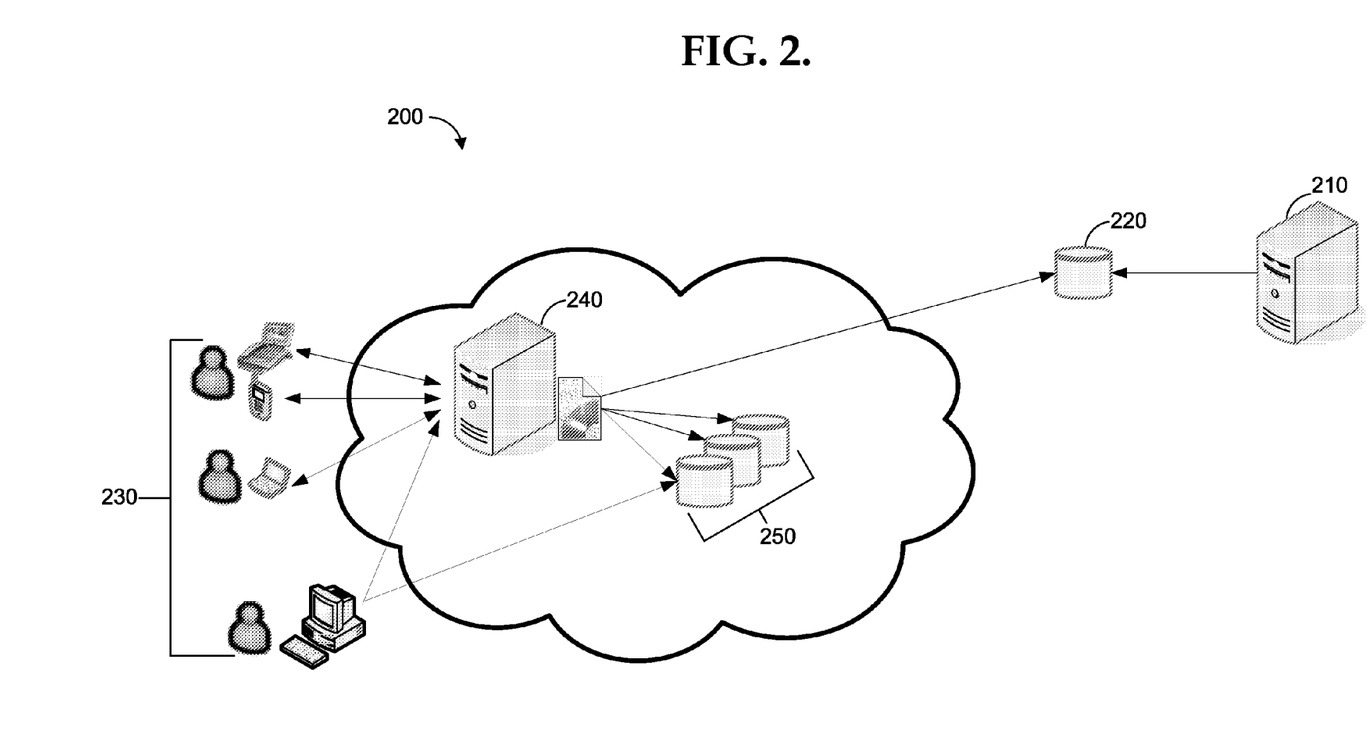
FIG. 2 is a block diagram illustrating a global synchronization system of the embodiments of the invention.

FIG. 2 is a block diagram, illustrating an embodiment of a global synchronization system 200. The global synchronization system 200 includes one or more remote servers 210 and one or more associated remote storage devices 220. The one or more remote servers 210 provide content sources to one or more users 230. Content sources can be obtained from the World Wide Web (WWW), by means of the Internet, as an example. However, content sources obtained from any electronic source, via an interconnected computing network, could be used with the global synchronization system 200.

Each user 230 has a synchronization subscription for managing changes and updates to the multiple content sources of interest. The synchronization subscription specifies all of the content sources from which the subscriber wishes to receive updates or notification of changes. The synchronization subscription further specifies the frequency of update or notification, and device specifications, as well as many other subscriber preferences.

A global synchronization server 240 works in conjunction with multiple data stores 250, to monitor the content sources stored in the data stores 250. The data stores 250 provide in-domain storage of local content on the data stores 250, with an optional uplinking capability of remote content from the remote server 210. Changes or updates are made to the devices of the users 230, according to specifications within each synchronization subscription. The global synchronization server 240 can also customize those changes or updates according to the particular devices of each user 230, as well as synchronize changes across multiple devices. For example, a user 230 may prefer updated changes from all content sources within the synchronization subscription to a desk top device. However, the user 230 may only want some of the updated changes to go to a laptop device, and only notification of certain updated changes to go to a wireless device, such as a mobile phone. In addition, certain updates to one device can be synchronized and automatically updated on one or more other devices, according to the synchronization subscription.

The global synchronization system 200 is not limited by multiple data types and protocols, because the global synchronization server 240 does not store the content sources. The content sources remain with the source, or the content sources can be uplinked to one or more data stores 250. This allows the global synchronization server 240 to simply manage the synchronization of all of the content sources, according to synchronization subscription specifications. The synchronization is managed using XML Document Manager Server (XDMS) protocol, but other protocols can be used, as well. The synchronization server 240 manages multiple devices and content sources. Therefore, the volume and diversity of content sources can be easily accommodated, in order to meet synchronization subscription demands.

Figure 3:
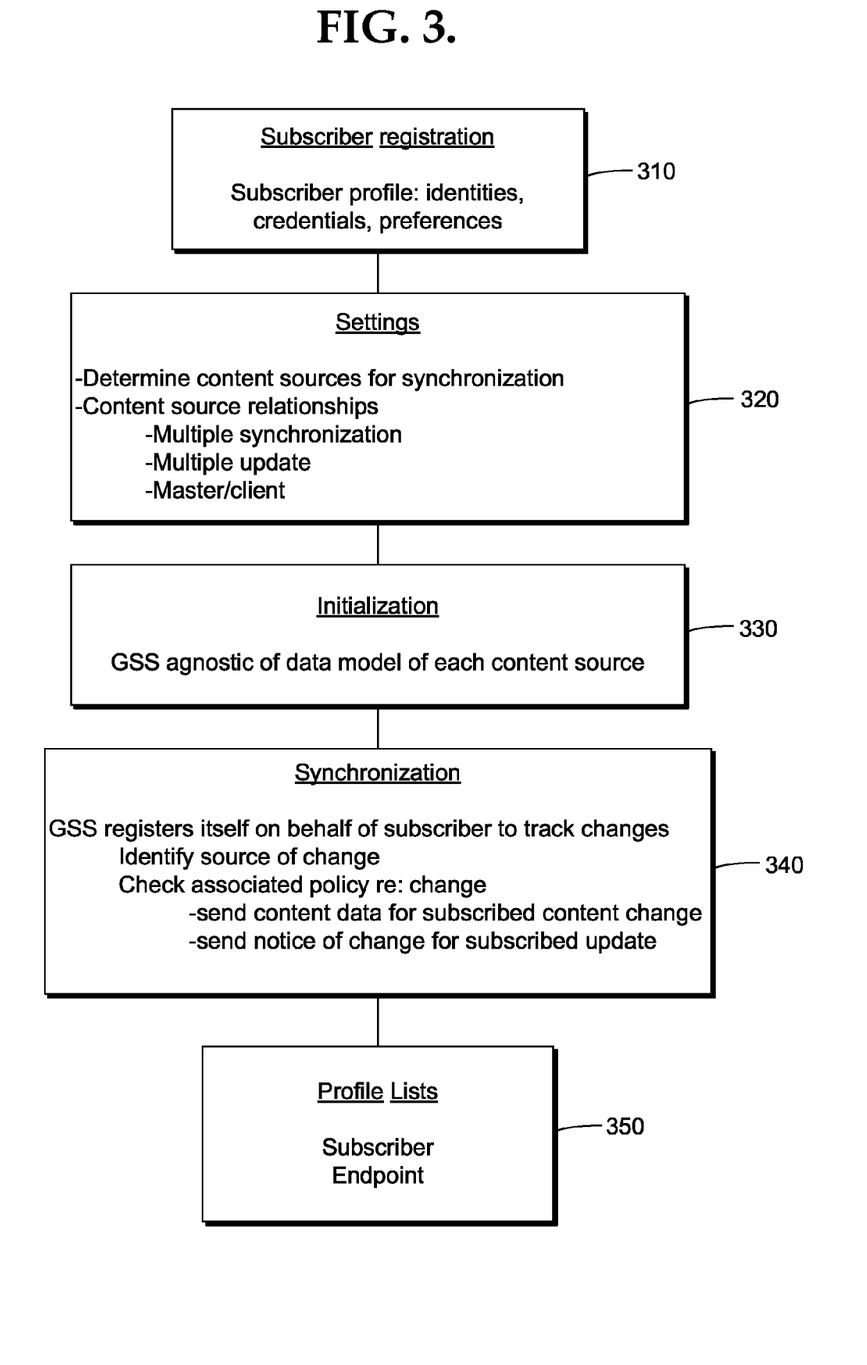
FIG. 3 is a block diagram illustrating a working model of a global synchronization system of the embodiments of the invention.

FIG. 3 illustrates the components of a global synchronization system (GSS). A GSS can be deployed at a mobile operator domain or established as a stand alone Internet service. A subscriber registers certain profile information, such as the subscriber identity, credentials, and preferences, as shown in registration component 310. The identity of the device(s) to be used is registered, as well as the desired content sources and the synchronization activities.

The settings of each registered content source and device are established in settings component 320. These settings determine the relationships between the registered content sources and devices. The content type of each content source is defined by: 1) content class, such as address book; 2) mime type, such as image or jpeg; and 3) filtering rules, such as address book phone number or address book email address. Various content source and device relationships may be established. One content source relationship embodiment is a multi-content source synchronization, where the content source can be changed at multiple places, such that respective states are maintained. Another content source relationship is a multi-content source update, whereby the content can be changed at any point in time at one place only. Some devices may perform mutual synchronization, while other devices may only want updates.

Another content source relationship is that of a master content source and a client content source. A subscriber can define a certain content source as the master for certain content type, as well as for other content sources. An example of such a relationship is one in which a certain Internet service is the master content source for pictures, whereas pictures can be stored on a device, such as a client. The master content source contains all of the relevant data for a particular content type. Therefore, if an update is performed at any master content source, then the update gets propagated to every client content source and device for which that master is defined. Client changes can propagate to any other entity, as long as they do not significantly alter the content, such as deleting the content, as defined by the subscriber. Only a device with access to a master content source can perform all of the operations, including the deletion of content. The scope of a content source as a master can be tied to certain content types and a set of certain content sources, as determined by the subscriber defined relationships. Multiple master content sources can also exist for the same content type and content sources. GSS can be established to default set every content source as a client, unless it is clearly established otherwise to act as a master.

Initialization of the GSS occurs in initialization component 330. The global synchronization server is completely agnostic of the data model of each content source. The content source is stored on the data stores. The GSS initializes the connection and subscription for each content source and each device of a subscriber. If a master content source is defined, then GSS builds an initial reference table from the master content source, then adds additional content source references.

Synchronization of the GSS occurs in synchronization component 340. When all of the content sources are initialized for a content type, GSS starts tracking the content updates. GSS registers itself on behalf of the subscriber to track changes. If a content source provides an application program interface (API) or data access mechanism, then GSS polls the content source for any changes. Once GSS detects a content update at a content source, then it tries to identify the source of that change, based upon the content metadata information in the content or update feed. Based upon the update, GSS looks up associated policies in order to provide update notification to various devices, which are interested in that content. If a device is only interested in notification about an update, then GSS just provides the information. For notification only, the device can update itself directly at a later time.

GSS can also control updates and notifications to entities outside of its domain with no interaction with devices inside of its domain, as specified by subscriber preferences. When multiple devices and entities are involved, GSS tracks the content updates and ensures successful notification or update propagation at every device.

There are subscriber and endpoint profile lists to be established, as illustrated by profile component 350. A subscriber profile list includes an identifier for each user's device and all of the content sources of interest. Any required credentials, such as a login name and password, are established via the synchronization server. These credentials are included in the profile information that is initially established by the subscriber.

Figure 3A:
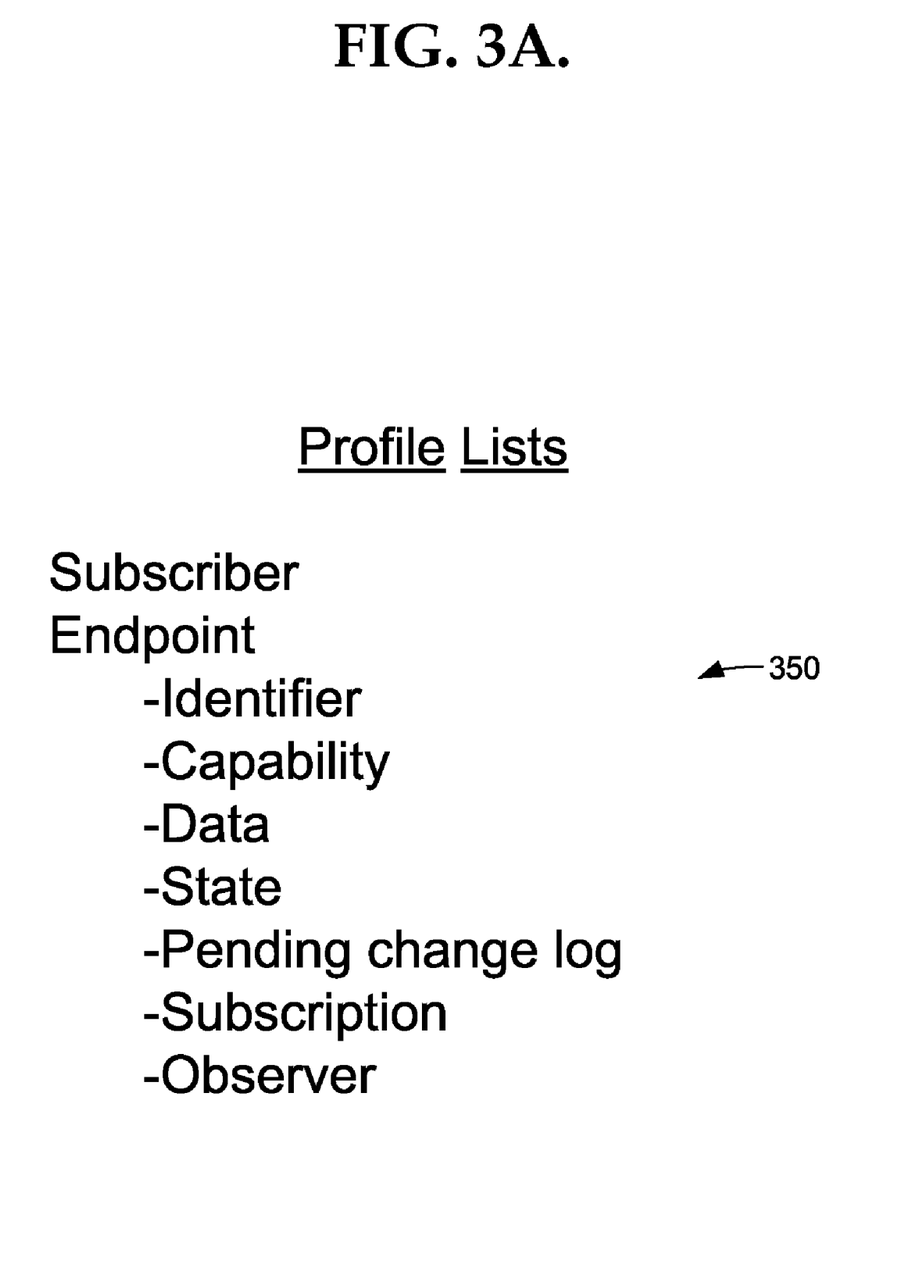
FIG. 3A is a block diagram illustrating profile lists of the embodiments of the invention.

FIG. 3A further illustrates the subscriber and endpoint profile lists, as profile component 350. The synchronization server views content sources and devices alike, as endpoints. The objective of the synchronization server is to manage the synchronization and updates between all of the content sources and devices. Each endpoint has a list established for capability and content profiles, state, subscription, and observer. A content source identifier list includes a Uniform Resource Identifier (URI) of each content source. A device capability list includes the protocols for application profiles used on a device, and a protocol and capability support profile used by each content source. A data list includes the type of content, and any content rules for the content group of master or client endpoints.

A endpoint state list gives the details about each endpoint's state, such as when the endpoint was last modified, and details as to an update which could have been caused by multiple endpoints. A log of pending changes could also be part of an endpoint's state list.

A content source subscriptions list establishes the content sources which need to be watched for changes, which are then relayed to other content sources or devices. The relationship state and applicable relationship rules need to be defined. Relationship rules, in some instances, utilize a tracking mechanism, such as a timer or a periodic check of the content source. When changes are detected, rules relating to the type of update are utilized. Once the update has been completed, notification or some other update mechanism is implemented. An interest level or priority is usually assigned, such as low, medium, or high.

A content source observers list is similar to the subscription list, except that the observers list pertains to the devices that are watching the subject content sources for any changes.

Figure 4:
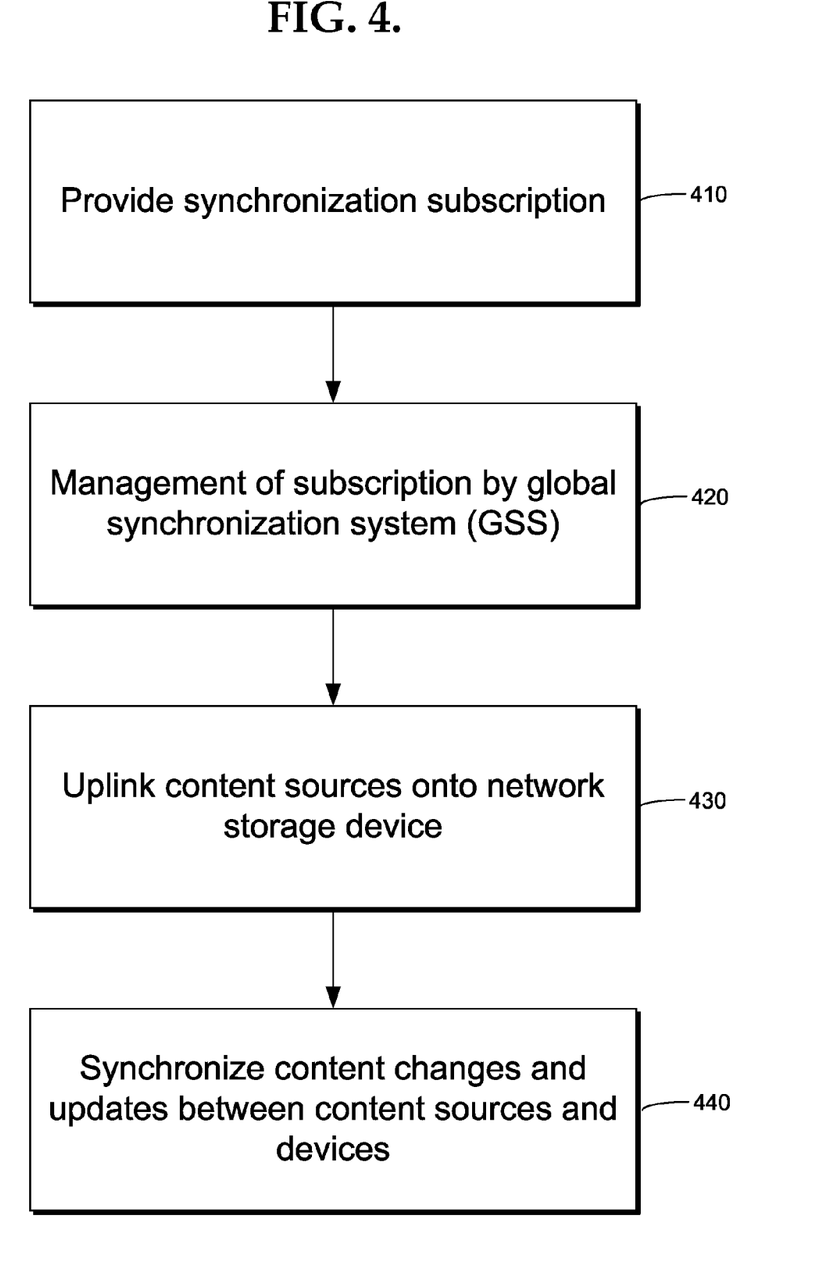
FIG. 4 is a flow diagram illustrating a synchronization method of a global synchronization system of the embodiments of the invention.

A method of synchronizing content sources and devices, using the global synchronization system is illustrated in the flow chart of FIG. 4. A synchronization subscription is set up in step 410, wherein a subscriber defines the content sources of interest. The relationships between the content sources and the user devices are also defined. Management of the subscription is implemented using the global synchronization system (GSS), as shown by step 420. The GSS utilizes a global synchronization server, in conjunction with a plurality of data stores, wherein the data stores form a network storage device. In step 430, the selected content sources can be uplinked onto the network storage device by the remote server of each content source. The uplinking of content sources is achieved by connecting with each of the content sources, according to a respective protocol for each of the content sources. Alternatively, a device can retrieve the content directly from the remote source. In step 440, the content changes and updates are synchronized between the selected content sources and devices, by the global synchronization server. The synchronization is managed using XML Document Manager Server (XDMS) protocol, but other protocols can be used, as well.

As previously mentioned, the utilization of a global synchronization server with a separate network storage device provides greater efficiency. The content sources are stored on the network storage device. Therefore, the global synchronization server has the primary task of managing the subscriber specifications, without serving as a data storage facility, or having to interact with possibly several different protocols.

Many different arrangements of the various components depicted, as well as components not shown, are possible without departing from the spirit and scope of the several embodiments of the invention. Embodiments of the invention have been described with the intent to be illustrative rather than restrictive. Alternative embodiments configured with after-knowledge equivalents are within the scope of the embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of synchronizing content changes, comprising:
    providing a plurality of synchronization subscriptions, comprising management of content changes and updates for a plurality of subscribing users;
    managing said plurality of synchronization subscriptions, via a global synchronization server;
    retrieving a plurality of content sources from a remote source;
    uplinking some of said content sources onto a network storage device, according to specifications in said plurality of synchronization subscriptions, wherein said network storage device is connected to said global synchronization server; and
    synchronizing said content changes and updates between said plurality of content sources and a plurality of devices, according to each of said respective synchronization subscriptions, wherein each respective synchronization subscription indicates that all of said content changes and updates should go to a desktop device of the plurality of devices, at least some of said content changes and updates should go to a laptop device of the plurality of devices, and only a notification of at least some of said content changes and updates should go to a mobile communication device of the plurality of devices.

2. The method of claim 1, wherein said managing is achieved by an XML Document Manager Server (XDMS) protocol.

3. The method of claim 1, wherein said global synchronization server is configured apart from said network storage device.

4. The method of claim 3, wherein said network storage device comprises a plurality of data stores.

5. The method of claim 1, wherein said uplinking a plurality of content sources comprises uplinking from a remote server.

6. The method of claim 1, wherein each of said plurality of synchronization subscriptions encompasses content sources containing content across multiple domains.

7. The method of claim 1, wherein said uplinking is achieved by connecting with each of said content sources according to a respective protocol for each of said content sources.

8. The method of claim 1, wherein some of said content changes and updates differ from others of said content changes and updates for said plurality of devices within a single synchronization subscription.

9. The method of claim 1, wherein a content type of each of said content sources is defined by content class, Multipurpose Internet Mail Extensions (MIME) type, and filtering rules.

10. The method of claim 1, wherein each of said plurality of synchronization subscriptions comprises a content source list, wherein said content source list specifies profile, state, subscription, and observer criteria.

11. The method of claim 10, wherein said content source list comprises identifier, capability, and data profile specifications.

12. The method of claim 10, wherein said state list comprises a most recent modification time, any multiple event details arising from said content changes and updates, and any pending changes.

13. The method of claim 1, wherein at least one of said plurality of content sources has authority over others of said plurality of content sources, according to its respective synchronization subscription.

14. A global synchronization system, comprising:
a plurality of synchronization subscriptions, configured to manage activities of tracking and implementing content changes and updates between a plurality of content sources and a plurality of device endpoints;
a global synchronization server configured to manage said plurality of synchronization subscriptions and synchronize said content changes and updates;
a plurality of data stores, connected to said global synchronization server;
a remote server, comprising some of said plurality of content sources;
a remote storage device; wherein some of said content sources are uplinked to said plurality of data stores, and others of said content sources are retrieved directly from said remote server or from said remote storage device to said device endpoints; and
the global synchronization server further configured to synchronize said content changes and updates between said plurality of content sources and said plurality of device endpoints, according to each of said respective synchronization subscriptions, wherein each respective synchronization subscription indicates that all of said content changes and updates should go to a desktop device of the plurality of device endpoints, at least some of said content changes and updates should go to a laptop device of the plurality of device endpoints, and only a notification of at least some of said content changes and updates should go to a mobile communication device of the plurality of device endpoints.

15. The system of claim 14, wherein said system can be deployed as a wireless operator domain or established as a stand alone internet service.

16. The system of claim 14, wherein said global synchronization server is configured apart from said plurality of data stores.

17. The system of claim 14, wherein some of said content changes and updates differ from others of said content changes and updates for said plurality of device end points within a single synchronization subscription.

18. The system of claim 14, wherein a content type of each of said content sources is defined by content class, Multipurpose Internet Mail Extensions (MIME) type, and filtering rules.

19. The system of claim 14, wherein at least one of said plurality of content sources has authority over others of said plurality of content sources, according to its respective synchronization subscription.

20. The system of claim 14, wherein said global synchronization server uses an XML Document Manager Server (XDMS) protocol.

* * * * *